June 25, 1968     R. VICHR     3,390,316

PULSE SPEED REGULATOR FOR AN ELECTRIC MOTOR

Filed Nov. 22, 1965

INVENTOR.
Radek Vichr
BY

United States Patent Office 3,390,316
Patented June 25, 1968

3,390,316
PULSE SPEED REGULATOR FOR AN
ELECTRIC MOTOR
Radek Vichr, Brno, Czechoslovakia, assignor to Presna
Mechanika, narodny podnik, Stara Tura, Czechoslovakia
Filed Nov. 22, 1965, Ser. No. 509,046
4 Claims. (Cl. 318—325)

ABSTRACT OF THE DISCLOSURE

A centrifugal regulator is mounted to rotate with a motor. A class D regenerative amplifier has an output comprising a choke coil connected in series with the motor and a diode connected in parallel with the series connection of the choke coil and the motor with reverse polarity. A variable voltage divider is connected to the movable contact of the centrifugal regulator and in the input of the amplifier.

This invention relates to a pulse regulator of the speed of electric commutator motors, particularly of small DC commutator motors of the type used, for example, for driving magnetophones, gramophones, and the like.

Centrifugal regulators are generally used for regulating the speed of small commutator motors. The regulator comprises a couple of contacts which are closed in the rest position. In case the nominal speed for which the regulator is adjusted is exceeded, the contacts are opened due to the centrifugal force and interrupt the supply circuit of the motor. As soon as the speed drops to the nominal value the contacts are again closed and the supply circuit of the motor is again established. This operating cycle is repeated.

A drawback of a regulator of this type is its great liability to failures due to burning of contacts which transmit the whole operating current of the motor. An improvement can be achieved by the introduction of transistors into the operating circuit of the motor so that the centrifugal regulator connects the susbtantially smaller current of the base electrode. This circuit removes the drawback of the burning of contacts, the remaining disturbing influences, as the irregular motion of the motor, the large peak currents passing its commutator and voltage surges generated at the interruption of the current remain in their full degree.

The major part of these drawbacks is eliminated by an electric circuit comprising an integrating circuit at the input of the transistor. The transistor operates in this case as a variable resistance. The regulation is continuous, without shocks and irregularities. Since, however, the transistor does not operate in the connecting line, its allowable collector loss grows rapidly and simultaneously the efficiency of the whole regulating stage, which is particularly to be reckoned with in case current is supplied from batteries, drops quickly.

The drawbacks of the known arrangements are eliminated by the pulse speed regulator of commutator motors according to this invention, which comprises in combination a centrifugal regulator and a class D amplifier. A variable voltage divider is connected in the input of the amplifier.

An advantage of the pulse regulator according to this invention is the uniform speed of the motor without jerks and irregularities. The regulator operates with high efficiency. Since the regulator uses a recuperating or regenerating circuit of the electric motor, the transistor operates with a pulse train. Thus variations in the contact resistance of the centrifugal regulator have no influence upon the regulation due to the pulse operation of the transistor. The regulator of the present invention thus eliminates the main source of failure and of the instability of the regulation.

An example of an arrangement of a pulse regulator of the present invention is shown in the accompanying drawing, wherein.

Figure 1:
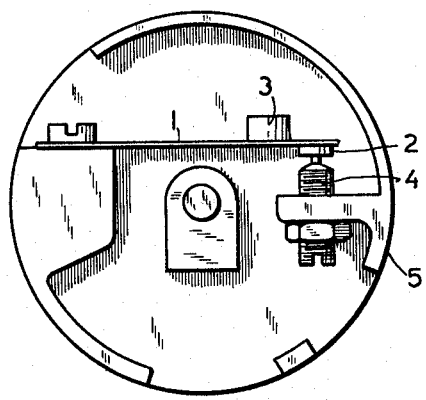
FIG. 1 is a view of the mechanical part of the centrifugal regulator of the present invention.

In FIG. 1, the pulse regulator according to this invention comprises a centrifugal regulator mounted on the rotating part of the motor 10. The regulator comprises a stationary contact 4 and a mobile or movable contact 2, which are closed in the rest position. A weight 3 is affixed to the mobile contact 2, arranged on an elastic spring 1. The magnitude of the weight 3 is determined by the nominal speed of the regulated motor 10. Both contacts 4 and 2 are supported by the supporting part 5.

Figure 4:
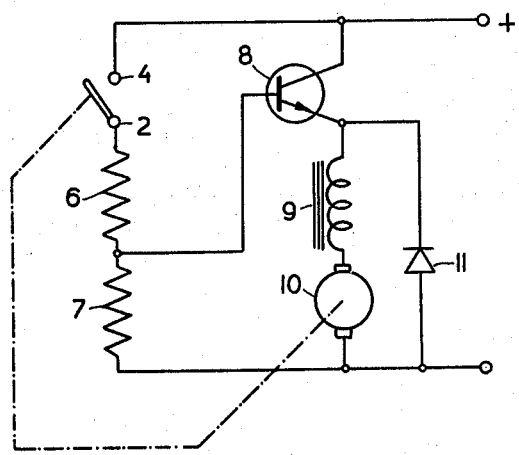
FIG. 4 is a circuit diagram of the pulse regulator of the present invention.

In FIG. 4, the stationary contact 4 is connected to the positive pole of a source of direct current and the movable contact 2 is connected via a voltage divider 6 and 7 to the negative pole of said current source. The output of the voltage divider 6 and 7 is connected to the input of a class D amplifier, which is represented by a transistor 8, the collector of which is connected to the positive pole of the source of DC voltage.

The electric motor 10 is connected in series with a choke coil 9 to the output of the amplifier, that is to the emitter of the transistor 8. A diode 11 is connected in parallel with the series connection of the choke coil 9 and the motor 10. The diode 11 is so connected that it is in its conductive condition when the motor 10 is regenerated during the periods when the transistor 8 is in its non-conductive condition.

The magnitude of the voltage of the voltage divider 6 and 7 is determined by the allowable voltage at the input of the amplifier, whereby the resistance 7 can be omitted. The centrifugal regulator is connected to the source of DC voltage by a commutator or sliding contacts, which are not shown in the figure.

When DC voltage from the source of DC voltage is applied to the arrangement and the contacts 4 and 2 are closed, the transistor 8 is opened and the motor 10 starts to move. After the nominal speed of the motor is attained, the contacts 2 and 4 are opened. The motor then reduces its speed up to the instant where the contacts 2 and 4 are again closed. The cycle is repeated.

Figure 2:
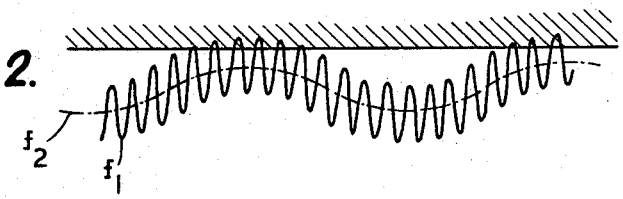
FIG. 2 illustrates the mechanical oscillations of the movable contact of the centrifugal regulator of FIG. 1.

In the course of the simple regulating process the contact 2 oscillates in a complex or complicated manner. Its motion combines two substantially sinusoidal motions having different frequencies $f_1$ and $f_2$, wherein $f_1 > f_2$ (FIG. 2). The frequency $f_1$ is the mechanical resonant frequency of the system 1, 2 and 3. This frequency is generated by oscillations due to periodical impact of the movable contact 2 and the stationary contact 4. The frequency $f_2$ is determined by the time constant of the regulator circuit.

Figure 3:
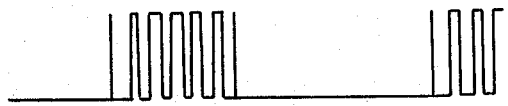
FIG. 3 illustrates the electric regulating pulses in the regulator circuit of the present invention.

As shown in FIG. 3, the width and the number of pulses produced by contact of the mobile contact 2 with the stationary contact 4 increase from a minimum width at the start of a group or train of pulses up to a maximum width in the central part of such pulse group and return to the minimum width at the end of such pulse group. The pulse trains or groups are supplied to the input of the class D amplifier and control its operation. The width of the pulses and number thereof in the group are directly proportional to the increase of the mechanical load of the motor 10 and are indirectly proportional to an increase in the supply voltage.

The pulse regulator according to this invention can be advantageuosly used for the maintenance of a constant speed in small DC motors, particularly when there is a larger mechanical load and a larger difference between the supply voltage and the nominal voltage of the motor.

I claim:
1. A speed regulator for an electric motor, comprising a centrifugal regulator comprising a stationary contact and a movable contact mounted to rotate with a motor in a manner whereby when said motor rotates at a speed below a determined magnitude said contacts are closed and when said motor rotates at a speed above said determined magnitude said contacts are opened;
a class D regenerative amplifier having an input and an output comprising a choke coil connected in series with said motor and a diode connected in parallel with the series connection of said choke coil and said motor with reverse polarity; and
a variable voltage divider connected to the movable contact of said centrifugal regulator and in the input of said amplifier.
2. A speed regulator as claimed in claim 1, wherein said amplifier comprises a transistor having a base electrode connected to said voltage divider and an emitter electrode connected to each of said choke coil and said diode.
3. A speed regulator as claimed in claim 2, wherein said voltage divider comprises a pair of resistors connected in series with the movable contact of said centrifugal regulator and wherein the base electrode of said transistor is connected to a common point in the connection between said resistors.
4. A speed regulator as claimed in claim 3, further comprising a source of DC voltage having one polarity terminal connected to the stationary contact of said centrifugal regulator and another polarity terminal connected to each of said choke coil and said diode, and wherein said transistor has a collector electrode connected to said one polarity terminal of said DC source.

References Cited
UNITED STATES PATENTS

| | | | |
|---|---|---|---|
| 3,143,695 | 8/1964 | Hohne et al. | 318—325 X |
| 3,184,671 | 5/1965 | Riggs | 318—325 |
| 3,238,434 | 3/1966 | Blitz et al. | 318—325 |
| 3,242,409 | 3/1966 | Edwards | 318—325 |
| 3,311,804 | 3/1967 | Kusserow | 318—325 |
| 3,317,807 | 5/1967 | Dorfner et al. | 318—325 |

ORIS L. RADER, *Primary Examiner.*

J. J. BAKER, *Assistant Examiner.*